Oct. 20, 1931.  K. S. CLAPP  1,828,317
LUBRICATOR
Filed Aug. 21, 1928   2 Sheets-Sheet 2
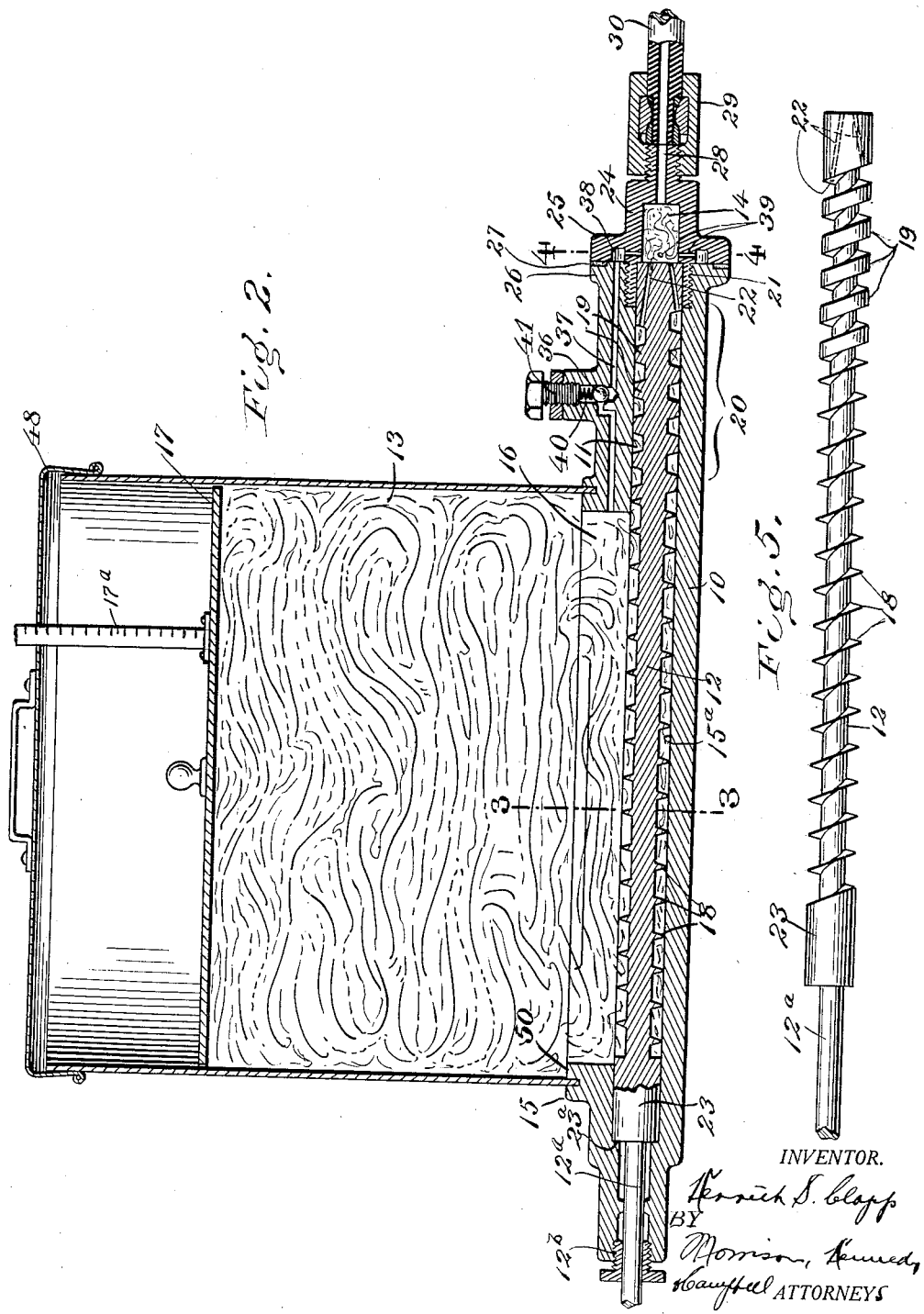
INVENTOR.
Kenneth S. Clapp
BY
Morrison, Kennedy,
Hauptlel ATTORNEYS Patented Oct. 20, 1931

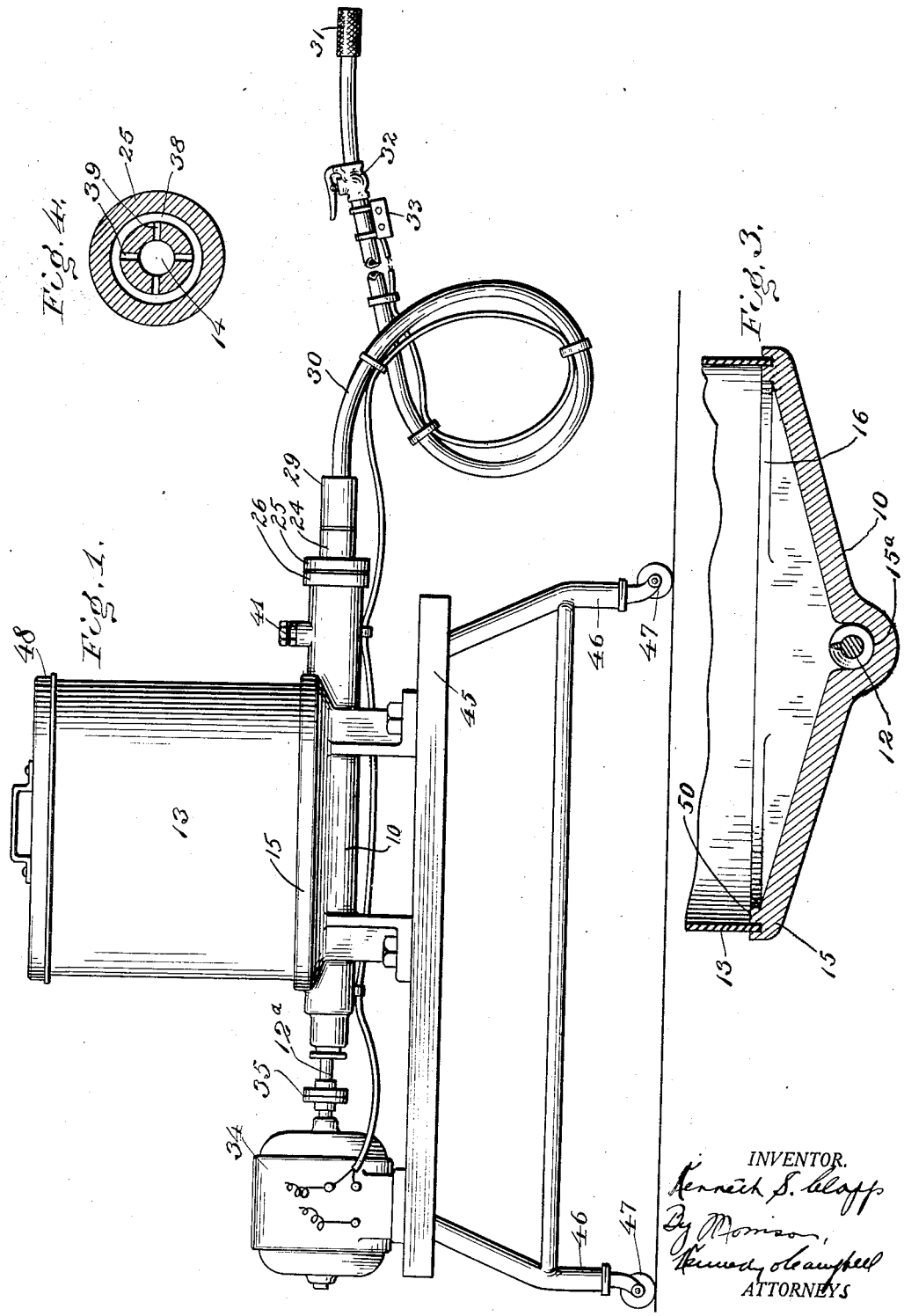

1,828,317

UNITED STATES PATENT OFFICE

KENNETH S. CLAPP, OF CLEVELAND, OHIO

LUBRICATOR

Application filed August 21, 1928. Serial No. 301,053.

This invention relates to lubricators, and has particular reference to such devices for applying grease or other heavy lubricants to machine parts in automobile service stations, factories, and the like.

Lubricators of this general type, heretofore available, have embodied air compressors, booster pumps, and valves, assembled together in a unit by which the grease is delivered through a flexible hose to the machine parts to be lubricated, but such devices have given rise to serious objections for several reasons. The grease is forced into the cylinder of the booster pump by air pressure from the compressor, and frequently such devices become air bound because the air works its way through and past the grease and into the booster pump. Furthermore, they are frequently rendered inoperative or inefficient because foreign substances in the grease become lodged in the valve seats, interfering with the proper functioning of the valves. Also, because of structural complications, the cost of manufacture of such prior devices has been comparatively high.

These and other objectionable features of the prior art are overcome by the present invention which has for its object the provision of a lubricator which will be simple in construction, durable and dependable in service, capable of being economically produced, and a substantial advance in the art.

Specifically, the invention contemplates a lubricator comprising a main casing within which a screw is rotatable for feeding the grease from the bottom of a reservoir into a pressure chamber, from which it is conducted to the desired machine parts by a conduit which is preferably flexible and adapted for connection to the usual grease cups, filler plugs, or the like. The main casing has a grease supply opening of substantial proportions through which the grease is fed by gravity to a trough in which the screw is exposed to the grease throughout the major portion of its length, and after being carried past the supply opening, the grease enters a pressure zone wherein the threads of the screw are modified in such manner as to create high pressure upon it. Within this pressure zone, the screw has a close running fit in order to facilitate the generation of pressure, and preferably means, including a check valve, are provided to relieve any excess pressure. A manually controlled valve is located at or near the free end of the flexible conduit to permit or preclude the passage of grease from the conduit, and an electric switch may also be placed adjacent to said valve for controlling the starting and stopping of an electric motor which drives the feed screw. The motor and lubricator are preferably mounted upon a small truck or carriage to render the whole unit readily portable, by virtue of which fact the device is very convenient for operation.

The foregoing and other objects, features, and advantages of the invention will be readily understoood from the following description in connection with the accompanying drawings, wherein one form of the invention has been shown by way of illustration and wherein:

Fig. 1 is a side elevation of a lubricator made in accordance with the invention;

Fig. 2 is a vertical longitudinal sectional view through the same;

Fig. 3 is a fragmentary transverse sectional view on line 3—3 of Fig. 2;

Fig. 4 is a sectional view on a larger scale on line 4—4 of Fig. 2; and

Fig. 5 is an elevation of the feed screw per se.

As clearly shown in the drawings, the improved lubricator comprises a relatively long and narrow screw casing 10 having a central longitudinal bore 11 within which a feed screw 12 is rotatable to force grease or other heavy lubricant from a reservoir 13 to and through a pressure chamber 14 adjacent one end of the casing 10. The reservoir 13 is in the nature of a cylindrical tank formed of sheet metal or the like and may be secured in any desired manner to an annular flange portion 15, which is preferably cast integral with the casing 10. This flange portion 15 slopes downwardly from opposite sides, as best shown in Fig. 3, to present a central narrow trough or channel 15ª in longitudinal alignment with the bore 11, leaving at the top a substantially circular feed opening 16 of considerably greater cross-sectional area than that of the bore 11. In practice, the degree of slope of the flange walls will probably be made much greater than that indicated in the drawings, which is only intended to be illustrative. As the screw is rotated in a manner to be hereinafter explained, the grease is propelled longitudinally in the trough 15$^a$, and the resultant suction, together with the weight of the grease, insures a constant supply of the material to keep the screw submerged. The weight of the grease may be augmented by that of a follower plate 17 which rests loosely upon it within the reservoir, and this follower plate carries an upwardly extending gage bar 17$^a$ whereby the amount of grease in the reservoir can be readily determined.

While the screw 12 may be formed in different ways, it is preferred to employ one as shown in Figs. 2 and 5, wherein the threads, altho of constant pitch, are characterized by the fact that those threads 18 below the feed opening 16 are relatively thin and tapered to knife edges, while those within the bore 11 at the discharge side of the feed opening are considerably thicker, as indicated at 19. These thicker threads 19 have a close running fit within the bore 11 and provide a substantial bearing for the screw as well as a pressure zone 20 within which pressure is generated by virtue of the reduced spacing between the threads. At its rearward end, the screw has a substantial bearing at 23 in the casing, and an annular shoulder 23$^a$ takes the end thrust. From this bearing the screw shaft 12$^a$ extends outwardly through a stuffing box or gland 12$^b$ to effectively prevent any leakage of lubricant at this end of the casing. The forward end of the screw has a cylindrical plug portion which is journaled in a bushing 21, which latter is threaded into a counterbore in the end of the casing 10 and is provided with a plurality of longitudinal ports 22 establishing communication between the pressure zone 20 and the pressure chamber 14 in a fitting 24 with which the bushing 21 is integrally formed. The ports 22 may be varied both in number and area whereby to control the quantity and pressure of the grease delivered to the chamber 14, there being only two such ports in the illustrated embodiment. This fitting 24 may be made of bronze or equivalent material and has an annular flange 25 to bear against the end flange 26 of the casing, the joint between them being rendered fluid-tight by means of a gasket 27. The outer end of the fitting 24 has a central bore 28 and is adapted for connection with a coupling 29 on one end of a flexible hose 30 or other conduit by means of which the grease is conducted away from the pressure chamber 14 and delivered to machine parts to which the free end of the hose is connected by a coupling 31 of any ordinary or preferred form.

The hose 30 is preferably composed of metallically reinforced vulcanized fabric and is usually made from eight to ten feet in length so that it can be conveniently applied in different places. Adjacent its free end, it is provided with a valve 32 which can be manually opened to permit passage of grease, and automatically closed to preclude such passage when the manual pressure is released. Also mounted upon the hose 30, either with or adjacent to the valve 32, is an electric switch 33 by which the attendant or operator may control the starting and stopping of an electric motor 34, the shaft of which is coupled at 35 to the screw shaft 12$^a$. Thus rotation of the motor shaft causes the screw 12 to rotate, forcing the grease from the bottom of the reservoir 13 into the pressure chamber 14 and thence through the hose 30.

In order to prevent excessive pressure within the hose, a relief valve 36 is disposed in a by-pass 37, which extends longitudinally in the casing 10 and communicates at its rear end with the reservoir 13 while its front end communicates with an annular groove 38 formed in the face of the flange 25. Transverse ports 39 connect the groove 38 with the pressure chamber 14, as best shown in Figs. 2 and 4. The valve 36 is normally held closed by a compression spring 40, the pressure of which may be varied by an adjusting screw 41, and the arrangement is such that if the pressure on the grease rises above a predetermined maximum, it will automatically open the valve 36 and return the excess to the interior of the reservoir.

The apparatus above described can be made up as a portable unit if desired, by securing the casing 10 and motor 34 to a truck or carriage 45, the legs 46 of which are provided with casters 47 or the like. With this arrangement, the complete lubricator can be easily conveyed from one point to another in a service station or factory, so as to enlarge its sphere of usefulness, altho of course, in some installations the apparatus may be located in a fixed position. A cover 48 of any preferred type is preferably used to protect the contents of the reservoir from dust or other foreign substances, the cover being readily removable in order to replenish the supply of grease when necessary. The gage bar 17$^a$ previously mentioned extends through an opening in the cover 48, and is provided with any suitable graduations or indicia which cooperate with the upper surface of the cover to at all times register the amount of grease below the follower plate 17.

The operation of the device will no doubt be clear from the foregoing description, but a brief recapitulation may be helpful: Assuming the reservoir 13 to be filled with grease or other lubricant, the unit is rolled to a position in proximity to the automobile or other machine to be lubricated and connection made with a suitable source of electric current. The attendant then connects the hose coupling 31 to a grease cup, filler plug, or the like, and by manipulation of the switch 33 the motor 34 is started. This rotates the screw 12, feeding grease from the bottom of the reservoir 13 through the pressure zone 20, pressure chamber 14 and hose 30. As the operator manually opens the valve 32, grease is forced into the machine part to which the hose is coupled, and when sufficient grease has passed the operator releases the handle of valve 32, allowing it to close, disconnects the coupling 31 and then makes connection successively with other parts, repeating the valve opening operation. The length and flexibility of the hose 30 permits great latitude in making connections, so that a great many parts can be lubricated in a minimum amount of time. If the pressure generated by the screw threads 19 should at any time exceed the predetermined maximum, it will be relieved through the by-pass 37 as previously explained. Due to the increased thickness of the threads 19 and their close running fit within the bore 11, it will be practically impossible for the lubricant within the pressure zone to leak back past the threads, and therefore the lubricant will be positively forced into the pressure chamber 14. If desired, a check valve can be mounted at the discharge end of the screw to maintain the pressure within the hose after the screw has stopped rotating. Furthermore, by virtue of the relatively large feed opening 16, and the inclination of the botom wall of the reservoir toward the screw, the supply of lubricant to the screw will be positive at all times, affording little or no opportunity for the lubricator to become air bound. While a very slight amount of air might find its way downwardly between the inner surface of the reservoir wall and the body of grease, it will be stopped by the annular shoulder 50 which encircles the feed opening 16.

From the foregoing it will be evident that a substantial advance has been made in the art by providing a lubricator of extremely simple construction which will be strong and durable in service, efficient in operation, and economical to manufacture. The invention is, of course, susceptible of modification in the details of construction and arrangement of parts, and the right is herein reserved to make such changes as fall within the scope of the appended claims without departing from the spirit of the invention.

Having thus described my invention, what I claim is:

1. A lubricator of the class described comprising a casing having a cylindrical bore, the upper wall of which is removed throughout a portion of the length of the casing to provide a lubricant supply opening of substantial proportions, a lubricant reservoir extending upwardly from the casing and in free communication with said lubricant supply opening, a rotary impeller mounted in the bore and adapted to receive lubricant through said supply opening and force it longitudinally under pressure from the casing, a flexible conduit for conducting the lubricant from the impeller casing, and means for driving the impeller by power, the said impeller being in the form of a screw, the threads of which are of a constant pitch, but those adjacent the discharge end being considerably thicker than those in the supply opening, and said thicker threads having a close running fit within the cylindrical bore of the casing whereby to create a pressure zone.

2. In or for a lubricator of the class described, a feed screw which has helical threads of substantially constant pitch, and characterized by the fact that the threads adjacent one end of the screw are considerably thicker than those at the other end.

3. In or for a lubricator of the class described, a casing having a cylindrical bore, and a feed opening leading into said bore, the feed opening being of much greater cross-sectional area than the bore, and a feed screw rotatable in the bore, said feed screw being characterized by helical threads of substantially constant pitch, the threads at the discharge end of the bore being considerably thicker than those adjacent to the feed opening, and said thicker threads having a close running fit within the bore.

4. In or for a lubricator of the class described, a feed screw having cylindrical journal portions adjacent each of its ends and helical threads intermediate said journal portions, and being further characterized by a fluid delivery port which provides communication from the extremity of one of said journal portions to the groove of the adjacent thread.

5. In a lubricator of the class described, a casing having a cylindrical bore, and a feed opening leading into said bore, the feed opening being of much greater cross-sectional area than the bore, a pressure chamber at one end of the casing and coaxial with said bore, and a feed screw rotatable in the casing to propel lubricant from the feed opening to said pressure chamber, said feed screw being journaled at its opposite ends and having threads which are modified to provide a pressure zone within the bore at the discharge side of the feed opening, and the screw being further provided with a port which establishes communication between said pressure zone and the pressure chamber.

6. In a lubricator of the class described, a casing having a cylindrical bore extending inwardly from one end and a feed opening leading into said bore, a feed screw rotatable in said bore and below said feed opening, a bushing screwed into the casing at the outer end of the bore, said bushing having a pressure chamber in axial alignment with the screw and into which lubricant is forced from the bore by the screw, and means on the outer end of the bushing for connection with a hose coupling.

7. A lubricator of the class described comprising an elongated body having a longitudinal bore and a flange extending laterally at the opposite sides of the body, said flange being dished in cross-section and having a feed opening of substantial proportions intersecting the bore below the horizontal axis thereof, a screw rotatable in the bore and below said feed opening, said screw being characterized by helical threads of substantially constant pitch and constant diameter, the threads at the discharge end of the bore being considerably thicker than those adjacent to the feed opening, the thicker threads having a close running fit within the bore, and said screw being constantly submerged in lubricant by virtue of the inclined or dished upper surface of the flange, a pressure chamber at one end of the elongated body and in axial alignment with the screw, said pressure chamber being in communication with the discharge end of the bore, means to rotate the screw to force lubricant through the bore and into said pressure chamber, a conduit for conducting the lubricant from the pressure chamber as the screw is rotated, a manually controlled valve and switch for selectively causing or stopping passage of the lubricant through said conduit, and means including a relief valve to prevent generation of excess pressure in the pressure chamber and conduit.

In testimony whereof, I have affixed my signature hereto.

KENNETH S. CLAPP.